3,340,206
METHOD OF FORMING FINELY DIVIDED INORGANIC ACID SALTS
Arnold J. Morway, Clark, and Albert J. Bodner, Linden, N.J., assignors to Esso Research and Engineering Company, a corporation of Delaware
No Drawing. Filed Dec. 22, 1964, Ser. No. 420,442
4 Claims. (Cl. 252—389)

This application is a continuation-in-part of my prior application Ser. No. 181,458, filed Mar. 21, 1962, now abandoned.

This invention relates to methods of forming finely divided metal salts of inorganic mineral acids. Particularly, the invention relates to methods of forming finely divided metal salt by dispersing an aqueous solution of said metal salt in an oil solution or dispersion of an acid salt of an imidazoline, heating said dispersion of salts to evaporate water, and preferably precipitating finely divided metal salt by adding a volatile hydrocarbon solvent. While not completely understood, it is believed that the acid salt of the imidazoline acts as a crystal growth inhibitor to prevent formation of large crystals of the metal salt, as said metal salt is crystallized or precipitated, by coating with imidazoline salt the metal salt particles as they form to prevent their aggregation into larger particles.

Finely divided, water-soluble, oil-insoluble, metal salts of inorganic mineral acids such as trisodium phosphate, calcium sulfate, sodium nitrite, ammonium sulfate, sodium chloride, etc. are sometimes desirable for a number of purposes, including the preparation of fluid lubricants and lubricating greases. A number of such salts impart to lubricating oil, extreme pressure, antiwear, rust prevention, oxidation inhibition and other desirable properties, depending upon the particular salt used. Because of the oil insolubility of these inorganic acid salts, it had been generally necessary to use either surfactants, or more frequently, salts and soaps of higher fatty acids (e.g. $C_7$ to $C_{30}$ fatty acids), as suspending agents to maintain the oil-insoluble salts dispersed in the lubricating oil. Also, because commercial salts are rather coarse, if directly dispersed in the lubricating oil, the resulting composition is frequently gritty, possibly abrasive, and usually has poor structural stability. Mechanical pulverization of the salts to exceedingly fine powder is usually too expensive to be practical, and cannot generally be satisfactorily used at all if the salts are hygroscopic. Addition of aqueous solutions of the salt to the oil composition and then dehydrating the composition will usually result in undesirable agglomerates of the salt as it crystallizes from the water into the oil. Because of these various drawbacks, it has become the usual commercial practice in many cases to form the oil-insoluble salt in situ in the lubricating oil by neutralization of the inorganic acid with a metal base, in the presence of a surfactant or a higher fatty acid. This in situ technique will usually give the desired particle size. However, even this technique has several disadvantages. Specifically, the in situ technique requires long heating periods and very precise control of manufacturing variables to achieve the proper particle size distribution. Furthermore, an exactly neutral product is difficult to achieve in large scale preparations. For example, if an excess of metal base is used, the free alkali will tend to react with carbon dioxide of the air to form carbonate, which will usually tend to make the composition gritty and to form a crust upon storage. On the other hand, an excess of acid will usually impair the structural stability of the composition to give it a false hardness (in the case of greases), which then disappears upon working or upon exposure to shearing stresses. This latter phenomenon is believed to be caused by hydrogen bonding of the free acid, which bonds break upon shearing. If the manufacturing is not very carefully controlled, the particle size of part or all of the salt may be too large. This, in turn, may make a grease gritty, give rise to sedimentation of fluid lubricants, or reduce the thickening effect or antiwear properties or other desirable properties of the salt as compared to a similar lubricant containing a more finely divided salt. Furthermore, in some instances it is impossible to make the salt in the presence of the lubricating oil because the acid used to make the salt will undesirably react with the oil.

It has now been found that it is possible to preform metal salts of exceedingly fine particle size, (e.g. 5 microns or less), which preformed salts may then be added cold to a lubricating oil and dispersed therein to form the desired lubricants mentioned above. By this new technique, the long heating time and careful control previously necessary for the in situ formation of salts can be avoided and generally a much finer particle size can be achieved.

A particularly desirable oil-insoluble salt for lubricant manufacture is sodium nitrite which is recognized as an excellent rust preventive. Thus, lubricating greases of the water-insoluble or water-repellant type can cause corrosion of ferrous surfaces due to forcing small amounts of water against the metal surfaces, rather than forming water-grease emulsions with the oil in the outer phase which would protect ferrous surfaces. To inhibit this corrosion, sodium nitrite is frequently added to the grease. It is preferable that the sodium nitrite be in as small a particle size as possible to (1) give the greatest protection with the smallest amount, (2) prevent noisy bearing operation or scratching of metal surfaces which otherwise can occur with large particles of sodium nitrite, and (3) prevent plugging of centralized lubrication system screens. Also in certain type greases, organic surface active agents for dispersing sodium nitrite are undesirable since they can cause loss of structural stability due to their effect on the colloidal soap structure. In the past, sodium nitrite has been pulverized for grease incorporation either by hammer milling or ball milling. In the former method, small particle size is difficult to obtain. Even when a small enough particle size is initially obtained, it is difficult to keep the sodium nitrite from caking due to its hygroscopic nature. On the other hand, ball milling is tedious and uneconomical.

It has now been found that the particle size of normally crystalline inorganic acid salt, such as sodium nitrite, can be reduced to below 15 microns particle size by a chemical means. Briefly described, the preferred means of obtaining this small particle size is as follows: Salt of inorganic acid, e.g. sodium nitrite, is dissolved in water, preferably to form a saturated solution, e.g. 40–50 wt. percent sodium nitrite in water. This solution is then added to a small amount of mineral oil in which is dispersed a surface active agent of the amino imidazoline salt type. The resulting mixture is heated to drive off most of the water. The mass is then cooled to form a grease-like solid mass, into which is mixed a relatively large amount, e.g. about 2 times the volume of said grease-like solid, of a volatile hydrocrabon solvent such as Varsol, heptane, etc. The mineral oil and the imidazoline salt surface active agent dissolve in the volatile hydrocarbon solvent, while the inorganic acid salt, e.g. sodium nitrite, is precipitated in an extremely fine particle size. The precipitate may be filtered off or allowed to settle and the liquid decanted. The inorganic acid salt is then dried, and either protected with oil or employed immediately as the lubricant additive.

The amino imidazoline useful to form the salt surfactant in the just described process, include those having the general structure:

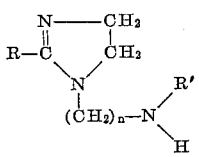

In the above formula, $n$ is about 2 to 6, preferably 2 to 3; R is a $C_6$ to $C_{22}$, preferably a $C_{16}$ to $C_{18}$, hydrocarbon group, either saturated or unsaturated, and preferably aliphatic; while R' is either hydrogen or a $C_1$ to $C_{18}$ alkyl group. Preferably, the number of carbon atoms in R is small, R' is hydrogen and $n$ is a small integer, e.g. 2, in order that the effectiveness of the imidazoline is as great as possible per pound of material. In other words, the effectiveness of the imidazoline in the present invention apparently depends on the ring structure and the terminal amino group, while the number of carbon atoms in the branches merely dilute the effectiveness of the material per pound of imidazoline.

A specific example of imidazoline of the above formula, which was used in the working examples of the invention, was a commercial 1-(2 amino ethyl-2-n-alkenyl-2-imidazoline) having the formula:

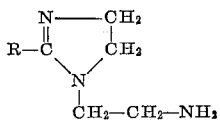

wherein R represents heptadecenyl and heptadecadienyl chains in a mol ratio of about 1:1, respectively. This product is available under the name Nalcamine G–39M.

The acid reacted with the imidazoline to form the salt surfactant, includes inorganic mineral acids such as ortho, pyro and meta phosphoric acids, hydrochloric acid, sulfuric acid, nitric acid, and also phytic acid which is closely related to phosphoric acid and probably forms phosphoric acid salt in the present process.

Phytic acid is the hexaphosphoric acid ester of inositol. It is a strong acid containing twelve acidic hydrogen groups. Its structural formula is believed to be as follows:

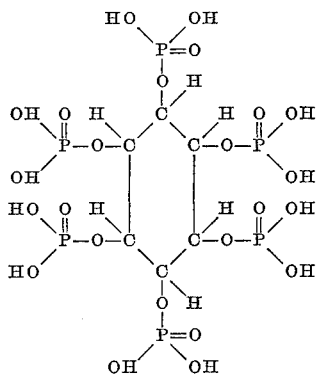

This material, having a molecular weight of 666 with 12 reactive hydrogen groups, has a combining weight (mole equivalent weight) of 55.

Phytic acid is derived from grain, and is a by-product from waste corn steep liquor. A description of phytic acid and its preparation is given in Chemical Engineering, Jan. 27, 1958, under the title, "Ion Exchange Now Yields Phytic Acid," published by McGraw-Hill Publishing Co., Inc., New York, N.Y.

The solvent used to precipitate the finely divided salt of inorganic acid should be one in which said salt is very insoluble. Suitable solvents include hydrocarbon solvents which can be aliphatic, aryl, cyclo-aliphatic, alkyl aryl, etc. Examples of such solvents include $C_5$ to $C_{10}$ alkanes such as n-pentane, isohexane; aromatic solvents such as benezene, toluene, etc. In some cases alcohols such as methanol, ethanol, isopropanol, etc. and chlorinated solvents, e.g. chloroform can be used.

The amino imidazoline salt is prepared by mixing the imidazoline and appropriate acid, preferably in a small amount of inert hydrocarbon oil, to form the imidazoline salt. Then, an aqueous solution, preferably saturated, of the inorganic acid salt to be finely divided is stirred into the mixture of oil and the imidazoline salt. Then, water is removed by heating or distillation, and solvent is added to precipitate finely divided inorganic acid salt. This salt can then be removed by filtration and later used in lubricant compositions or for other purposes.

Many of the finely divided salts of the invention can be advantageously incorporated into greases thickened with various thickeners such as: metal salts of $C_2$ to $C_{30}$ fatty acids, polymeric thickeners (e.g., polymers of $C_2$ to $C_4$ monoolefins of 10,000 to 200,000 mol. wt. such as polyethylene), inorganic thickeners, (e.g., clay, carbon black, silica gel), etc.

The fatty acid salt thickeners are formed by the neutralization of a fatty acid with a metal base. The fatty acid can be a high molecular weight fatty acid, an intermediate molecular weight fatty acid, or a low molecular weight fatty acid. The metal base will generally be an alkali or alkaline earth metal base. Frequently, mixed metal salts of different molecular weight fatty acids are used. For example, a mixed-salt thickener can contain alkaline earth metal (frequently calcium) salts of 4 to 30 molar proportions of a low molecular weight fatty acid (e.g. acetic acid) per molar proportion of higher fatty acid, e.g. oleic acid or capric acid. These mixed-salt thickeners are generally prepared by coneutralizing the various acids involved with metal base, e.g. lime, in situ in the lubricating oil. The lubricant can then be used as is, if a "cold set" lubricant is desired, or it can be heated to temperatures of about 225° to 550° F. to dehydrate the lubricant. Either solid greases can be formed in the preceding manner, or fluid or semi-fluids can be prepared, depending upon the amount of lubricating oil used.

The invention will be further understood by reference to the following examples which include preferred embodiments of the invention.

EXAMPLE I (All parts by weight)

18.3 parts of a mineral lubricating oil of 55 SUS at 210° F. and 10 parts of 1-(2 amino ethyl-2-n-alkenyl-2-imidazoline), Nalcamine G–39M, were added to a steam jacketed grease kettle and mixed together. Next, an aqueous solution containing 25 wt. percent of 85 wt. percent ortho phosphoric acid was added to the composition sufficient to give 1.7 parts of 85% phosphoric acid. The phosphoric acid resulted in forming a salt with the Nalcamine which thickened the oil so that a solid grease-like mass resulted. Next, 70 parts of sodium nitrite was added to the kettle in the form of a 40% aqueous solution, i.e. 40 wt. percent sodium nitrite and 60 wt. percent water. The composition was heated while stirring and the water slowly driven off until about 10% water was left in the finished solid grease-like homogeneous dispersion. This dispersion had a consistency of about a No. 3 grease. The grease-like material was then mixed with about 2 times of its weight of heptane in a separation funnel. Sodium nitrite precipitated as a fine talc-like material having a uniform particle size of between 5 and 10 microns. The sodium nitrite was then drawn off from the bottom of the funnel and residual amounts of solvent clinging to the nitrite was allowed to evaporate.

EXAMPLE II

Example I was repeated except that 2.2 parts of phytic acid as a 70% water solution was added and reacted with the imidazoline in place of the phosphoric acid of Example I. After precipitation with the hydrocarbon solvent, sodium nitrite was obtained having a maximum particle size of about 5 microns. The finely divided sodium nitrite particles were coated with a coating of Nalcamine phytate containing a trace of mineral oil. A portion of this precipitate, when left in the open for over a week, showed no tendency for the coated nitrite particles to form aggregates, or coalesce, or to form hard cakes, or lumps.

EXAMPLE III

Part A.—10 parts of Nalcamine G–39M and 17.8 parts of mineral lubricating oil were mixed together and 2.2 parts of phytic acid was added in the form of a 70% aqueous solution. This resulted in forming the Nalcamine phytate which thickened the oil to a grease consistency. 70 parts of sodium nitrite was then added in the form of a 40 wt. percent aqueous solution. The entire mixture was then heated to boiling until about 50 wt. percent of the total water present was removed by evaporation. Upon cooling, the composition was a very stable gel. This gel was then placed in a distillation flask equipped with a condenser and water trap. Heptane was added in an amount equal to the weight of said gel. The composition was then heated to boiling and water and heptane was distilled over. The distillate was condensed in the water trap, the water was separated and discarded while the trapped heptane was returned to the still for reboiling. As the water was removed, sodium nitrite was precipitated from the solution. Upon precipitation of all the sodium nitrite, the flask was removed from the heat and allowed to cool to about 150° F.

Part B.—Additional mineral lubricating oil was then added to the hot (150° F.) product of Part A in the flask. The composition was again heated to remove all of the heptane by distillation. The resulting product was a 50 wt. percent dispersion of finely divided sodium nitrite in the mineral lubricating oil.

In each of Examples I, II, III(A) and III(B), two mole equivalents of the inorganic acid or phytic acid was reacted per molar proportion of the imidazoline to form the imidazoline salt.

The ingredients used to prepare the products of Examples I, II, III(A) and III(B) are summarized in the following Table I:

TABLE I

| Ingredients (parts by weight) | Examples | | | |
|---|---|---|---|---|
| | I | II | III–A | III–B |
| Sodium nitrate (crystals) | 70 | 70.0 | 70 | 70 |
| Nalcamine G–39M | 10 | 10.0 | 10 | 10 |
| H₃PO₄ (85%) | 1.7 | | | |
| Phytic Acid | | 2.2 | 2.2 | 2.2 |
| Mineral lubricating oil, 55 SUS at 210° F. | 18.3 | 17.8 | 17.8 | 70 |

EXAMPLE IV

A lubricating grease was prepared as follows:

13.6 parts of hydrated lime, 10 parts of vegetable fatty acid, and 55.0 parts of mineral lubricating oil having a viscosity of 55 SUS at 210° F. were intimately mixed in a steam-jacketed grease kettle. 19.0 parts of glacial acetic acid was slowly added to the mixture, while stirring. The heat of reaction raised the temperature to about 210° F. External heating was then initiated and the temperature of the reaction mass raised to 320° F., where it was held for about 0.5 hour to dehydrate the reaction mass. The resulting grease was rapidly cooled to about 200° F. by passing cold water through the kettle jacket. One part of phenyl-alpha-naphthylamine was then added as an oxidation inhibitor. The grease was then cooled to 150° F. where two parts of the product of Example I was added by simple mixing into the grease. The grease was then cooled to 100° F. where it was finished by first passing through a Charlotte mill having a 0.003″ clearance and then passed through a Cornell homogenizer for deaeration before packaging.

The vegetable fatty acid used above was iso-oleic acid, which comprises chiefly elaidic acid, with minor amounts of oleic acid (9-octadecenoic acid), and other isomers of oleic acid, e.g. 12-octadecenoic acid, linoleic acid, etc.

EXAMPLE V

A second grease was prepared in the same general manner as the grease of Example IV except that the fatty acid was an animal fatty acid having the following properties:

| | |
|---|---|
| Color, ASTM | 1.1 |
| Free Fatty Acids, percent | 102 |
| Saponification number | 2039 |
| Titer, ° C. | 42.0 |
| Iodine number | 50 |

Slightly less acetic acid was used and 1% more lubricating oil was used. The sodium nitrite was that obtained from Example II.

EXAMPLE VI

A lubricating grease was formed in the same general manner as that of Examples IV and V, except that 3 wt. percent of the 50 wt. percent dispersion of sodium nitrite in lubricating oil prepared by the technique of Example III(B) was used.

The compositions prepared and their properties are summarized in Table II which follows:

TABLE II

| Ingredients (parts by weight) | Examples | | |
|---|---|---|---|
| | IV | V | VI |
| Glacial acetic acid | 19.0 | 18.0 | 18.0 |
| Mono-unsaturated fatty acid | 10.0 | | |
| Animal fatty acid | | 10.0 | 10.0 |
| Hydrated lime | 13.6 | 13.0 | 13.3 |
| Sodium nitrite | 2.0 | 2.0 | 1.5 |
| Phenyl α-naphthylamine | 1.0 | 1.0 | 1.0 |
| Mineral lubricating oil | 55.0 | 56.0 | 55.2 |
| Properties: | | | |
| Appearance | Excellent, smooth, uniform grease | | |
| Dropping point, ° F. | 500+ | 500+ | 500+ |
| ASTM penetration, 77° F., mm./10: | | | |
| Unworked | 300 | 299 | 293 |
| Worked 60 strokes | 310 | 305 | 303 |
| Worked 10,000 strokes | 315 | 303 | 305 |
| Rust test CRC–L–41 | None | None | None |
| Bearing noise | Low | Low | Low |
| Lubrication life,¹ hours, 10,000 r.p.m., 250° F. | | 2,000+ | |

¹ NLGI-ABEC Spindle Test.

As seen by Table II, the greases containing the rust inhibitor concentrates of the invention showed no rust in the CRC–L–41 Test after 14 days, and showed a low level of noise during operation of a bearing, which noise level was the same as the grease without any sodium nitrite.

The CRC–L–41 Test was carried out by coating chemically clean Timken bearings (cup and bearing) with a thin coating of the grease and subjecting the bearings to turning at 600 r.p.m. under a load to spread the grease in a thin layer. The cup and bearing assembly were then dipped in water and stored for 14 days in a closed glass jar containing a small amount of water so as to maintain a humid atmosphere. After 14 days, the bearing was then examined for rust.

The bearing noise test was carried out in a sound-proof room, measuring the noise level obtained during operation of a Timken roller bearing.

While the compositions of the invention gave no rust in the CRC–L–41 Test, a similar grease containing no rust preventive agent results in bad rusting of the bearing during the CRC–L–41 Test.

The grease of Example IV also showed no excessive tendency to plug or cause pressure build-up due to the sodium nitrite, when used for 2,000 hours in a Trabon centralized lubrication system involving high pressure forced feeding of lubricant through fine screens, and narrow diameter feed lines and orifices. By comparison, a similar grease, but where the sodium nitrite was commercially pulverized by hammer milling to an average of 35 micron particle size (with a maximum particle size of 100 microns) resulted in plugging of the screens in the Trabon lubrication system after 500 hours and excessive pressure build-up after 300 hours operation during laboratory comparison tests. In addition, this comparison grease (i.e. using hammer milled sodium nitrite) resulted in noisy bearing operation, being much noisier than a grease without any sodium nitrite.

The products of Examples I and II were tested for storage stability, along with a mechanically ground sodium nitrite, by simple exposure of the sodium nitrite particles to the atmosphere. The results are summarized in Table III, which follows:

TABLE III

*Comparison of sodium nitrite stability*

| Sodium nitrite: | Condition after exposure to atmosphere at 77° F. |
|---|---|
| Pulverized mechanically to 35 m. size. | Lumpy and undispersible in oil after 3 days. |
| Product, Example I | Starting to show aggregation after 10 days. |
| Product, Example II | Still smooth powdery material of about 10 m. size after 25 days. |

As seen by Table III, the most stable was finely divided sodium nitrite of Example II which contains a coating of the imidazoline phytate on the sodium nitrite, which protects the nitrite from the atmosphere. This finely divided nitrite is easily dispersed in a lubricating grease during manufacture. The coating on the sodium nitrite of the imidazoline phytate is more durable and much less easily removed with hydrocarbon solvents, than the imidazoline salts of phosphoric acid of Example I. However, both the products of Examples I and II were much superior to the mechanically ground sodium nitrite.

As illustrated by the preceding examples, a gel is usually formed by mixing the oil, the imidazoline salt, and the aqueous solution of the metal salt to be divided, and then evaporating water (if excessive) to obtain a solid gel (at 77° F.).

This gel can be formed by mixing the water, imidazoline salt, oil and the metal salt in any sequence. However, if is usually easier to mix the water and metal salt together to form an aqueous solution, and the oil and imidazoline salt together to form an oil dispersion, and then mix said aqueous solution and oil dispersion to form said gel. Also, it will usually be desirable to make the imidazoline salt in situ in the oil, and this is readily done by adding a water solution of the acid to an oil solution of the imidazoline to form said imidazoline salt. The metal salt is then precipitated from this gel by the addition of solvent. Also, the precipitation may be conducted while the water is being evaporated as in Example III, Part A.

To further illustrate the invention, Example I is repeated but using 70 parts of ammonium sulfate in the form of a saturated aqueous solution in place of the 70 parts of sodium nitrite in a 40% aqueous solution.

In summary, the present invention provides a way of chemically dividing metal salts of inorganic mineral acids. While considerable variation in the relative proportions of the various ingredients is possible, following are relative proportions which will generally be used in carrying out the invention. Based upon 1 part by weight of metal inorganic acid salt to be divided, e.g. sodium nitrite, then about 0.1 to 10.0 parts of imidazoline salt is used. This imidazoline salt is the reaction product of about 1 to 2 mole equivalents of inorganic mineral acid or phytic acid per molar proportion of imidazoline. The amount of oil to disperse the imidazoline salt will generally be about 0.2 to 5 parts by weight of oil per part by weight of imidazoline salt. A water solution of inorganic acid metal salt, e.g. 2 to 80 wt. percent salt in 98 to 20 wt. percent water, will be generally used and added to the imidazoline oil dispersion. Water is then generally evaporated so that total water content is reduced to about 0 to 70 wt. percent, preferably 5 to 60 wt. percent, of the weight of the entire mixture of water-inorganic acid metal salt-imidazoline salt-oil. 0.5 to 4 volumes of solvent, per volume of said mixture, can be generally added to precipitate the finely divided metal salt. If the total water content is reduced to about 5 to 50 wt. percent of the entire mixture before the solvent is added, then a more finely divided salt is usually obtained than if the water content had been reduced to 0% before the addition of the solvent.

The finely divided metal salts of the invention will generally be used in amounts of 0.1 to 5.0 wt. percent of said metal salt in lubricating oil or lubricant.

What is claimed is:

1. A method of preparing one part by weight of finely divided sodium nitrite of less than 15 microns comprising dispersing 0.1 to 10 parts of imidazoline salt in 0.5 to 5 parts of inert oil, said imidazoline salt being the reaction product of a molar proportion of imidazoline with 1 to 2 mole equivalents of acid selected from the group consisting of phosphoric acid and phytic acid, wherein said imidazoline has the general formula:

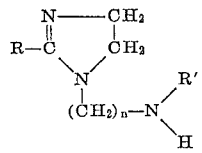

wherein $n$ is an integer of about 2 to 6, R is a $C_6$ to $C_{22}$ hydrocarbon group and R' is selected from the group consisting of hydrogen and $C_1$ to $C_{18}$ alkyl groups, adding an aqueous saturated solution of said sodium nitrite, heating to evaporate water until the water content of the entire mixture is reduced to about 0 to 70 wt. percent of said mixture and a gel is formed, and adding 0.5 to 4 volumes of solvent in which said sodium nitrite is insoluble per volume of said gel to precipitate said finely divided sodium nitrite and removing said precipitated nitrite.

2. A method of forming finely divided solid particles of less than 15 micron size, of oil-insoluble, water-soluble, inorganic acid metal salt selected from the group consisting of trisodium phosphate, calcium sulfate, sodium nitrite, ammonium sulfate and sodium chloride, which comprises forming a mixture of an aqueous solution containing about 20 to 98 wt. percent water and about 2 to 80 wt. percent of said inorganic acid metal salt dissolved in said water, inert oil, and the imidazoline salt of a molar proportion of an amino imidazoline with about 1 to 2 mole equivalents of acid selected from the group consisting of phosphoric acid, hydrochloric acid, sulfuric acid, nitric acid and phytic acid, heating to reduce the water content of said mixture to about 0 to 70 wt. percent water, based on the weight of said mixture, to thereby form a grease-like solid mass, then adding 0.5 to 4 volumes of solvent in which said salt is insoluble per volume of said mass to thereby precipitate said inorganic acid metal salt from said mass, and removing the precipitated inorganic acid metal salt, wherein said amino imidazoline has the formula:

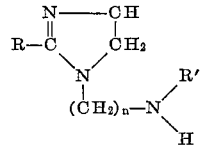

wherein $n$ is an integer of about 2 to 6, R is a $C_6$ to $C_{22}$ hydrocarbon group and R' is selected from the group consisting of hydrogen and $C_1$ to $C_{18}$ alkyl groups, wherein about 0.1 to 10.0 parts by weight of said imidazoline salt is used per part by weight of said inorganic acid metal salt, and wherein about 0.2 to 5 parts by weight of said inert oil is used per part by weight of said imidazoline salt.

3. A method according to claim 2, wherein said oil is mineral lubricating oil, and said mixture is formed by mixing said imidazoline in said oil and adding an aqueous solution of phytic acid, and then adding an aqueous solution of said inorganic acid metal salt to said oil.

4. A method according to claim 1, wherein said inert oil is a mineral lubricating oil, said imidazoline is 1-(2 amino ethyl-2-n-alkenyl-2-imidazoline) in which said alkenyl group is a mixture of heptadecenyl and heptadecadienyl radicals, said acid is phytic acid, and said solvent is heptene.

References Cited

UNITED STATES PATENTS

| | | | |
|---|---|---|---|
| 2,355,837 | 8/1944 | Wilson | 260—309.6 |
| 2,971,911 | 2/1961 | Caruso | 252—18 X |
| 3,013,968 | 12/1961 | Blake | 252—18 |
| 3,178,367 | 4/1965 | Duben et al. | 252—25 X |
| 3,223,624 | 12/1965 | Morway et al. | 252—18 |
| 3,231,494 | 1/1966 | Morway | 252—18 |

FOREIGN PATENTS

| | | |
|---|---|---|
| 1,121,260 | 1/1962 | Germany. |
| 1,121,760 | 1/1962 | Germany. |

LEON D. ROSDOL, *Primary Examiner.*

M. WEINBLATT, *Assistant Examiner.*